United States Patent [19]

Davies et al.

[11] Patent Number: 5,202,368
[45] Date of Patent: Apr. 13, 1993

[54] SILICONE COATING COMPOSITIONS

[75] Inventors: Stephen P. Davies, Buckinghamshire, England; Alois Babicka, Blacktown; Geoffrey B. Anderson, Richmond, both of Australia

[73] Assignee: ICI Australia Operations Proprietary Limited, Melbourne, Australia

[21] Appl. No.: 585,098

[22] PCT Filed: Jan. 30, 1990

[86] PCT No.: PCT/AU90/00028
§ 371 Date: Sep. 27, 1990
§ 102(e) Date: Sep. 27, 1990

[87] PCT Pub. No.: WO90/08810
PCT Pub. Date: Aug. 9, 1990

[30] Foreign Application Priority Data

Jan. 31, 1989 [AU] Australia .................. PJ2482

[51] Int. Cl.$^5$ .................. C08J 3/26; C08K 5/24
[52] U.S. Cl. .................. 524/266; 524/265; 524/269; 524/506
[58] Field of Search .......... 524/266, 269, 506, 265

[56] References Cited

U.S. PATENT DOCUMENTS 4,444,946  4/1984  Alberts et al. .......... 525/445
4,446,259  5/1984  Vasta .................. 524/506
4,791,029  12/1988 Fau et al. .............. 524/459
4,803,233  2/1989  Narula et al. .......... 524/366

FOREIGN PATENT DOCUMENTS 0084145  7/1983  European Pat. Off. .
0217257  4/1987  European Pat. Off. .
0275051  7/1988  European Pat. Off. .
8300151  1/1983  World Int. Prop. O. .

Primary Examiner—Paul R. Michl
Assistant Examiner—U. K. Rajguru
Attorney, Agent, or Firm—Cushman, Darby & Cushman

[57] ABSTRACT

An aqueous silicone compound-containing coating composition comprises an addition polymer dispersion and at least one silicone compound, the silicone compound forming part of the disperse phase of a dispersion of multi-polymer particles.

The silicone compound may be monomeric, oligomeric or polymeric and it may either be added in existing form or be prepared in situ. The provision of reactive groups on either or both of silicone compound as addition polymer gives cross-linking capacity.

An unusually wide variety of silicones can be used in the compositions including some not normally associated with coating compositions.

14 Claims, No Drawings

SILICONE COATING COMPOSITIONS

This invention relates to aqueous coating compositions and more particularly to aqueous coating compositions based on silicone compounds.

Coating compositions based on silicone compounds, that is, compounds which comprise at least one Si—O—Si linkage, have been widely used in industrial finishing, especially for coating coil, because they offer an outstanding combination of cost, flexibility (capability of withstanding forming operations subsequent to coating) and performance on exterior exposure. The resin used is often silicone-modified polyester, that is a polyester which has been reacted with a silicone compound, and often known in the trade as "SMP".

The silicone coating compositions which have hitherto been widely used and accepted by the industry have been solvent-borne. The desire to reduce pollution and minimise the loss of expensive solvent has led to various attempts to produce a water-borne silicone coating composition.

For example, Harder in GDR Patent 13461 describes a storage-stable aqueous paint which comprises a mixture of an acrylic film-forming dispersion, a polysiloxane resin in the form of an aqueous dispersion in the presence of organic solvent and a minor quantity of an aqueous anionic dispersion based on an acrylic acid ester copolymer. The resulting compositions are stated to have good adhesion and weathering properties. Japanese Patent Publications 59-161417 and 60-243167 (to Daicel Chemical Industry KK and Toa Gosei Chemical Industry KK respectively) describe similar mixed systems.

A system which has proved useful in practice is the siliconised latex, that is a dispersion of film-forming (generally acrylic) polymer which has been modified with silicone. The resulting resin system is water-borne and has good properties. A description of such systems may be found in, for example, "Resin Review", Volume XXXVII (1987), No. 1, p. 12-18 (published by the Rohm and Haas Co., Philadelphia, PA, USA). Systems such as those described in the prior art referred to hereinabove suffer from either or both of two problems, namely poor performance in comparison with solvent-borne systems in important areas such as exterior durability, or an inability to accept a suitably wide range of silicone compounds, thus limiting the range of coating compositions which can be made. The properties of silicone compounds, and therefore the properties of any coating composition in which they are incorporated, vary widely with the composition of the silicone compound itself. A silicone compound which is suitable for one end use may not be suitable for another, yet because of the different compatibilities of different silicone compounds with water, it is often not possible simply to substitute one silicone compound for another, and the entire coating composition may need to be reformulated.

It has now been found that is possible to provide a coating composition which allows the use of any kind of silicone compound currently available. Moreover, many of these coating compositions outperform the known equivalent water-borne systems and often the high-performance solvent-based systems. There is therefore provided, according to the present invention, an aqueous silicone compound coating composition comprising an addition polymer dispersion and at least one silicone compound, the silicone compound forming part of the disperse phase of a dispersion of multi-polymer particles.

By "multi-polymer particles" is meant particles which comprise a blend of at least two different polymers. They are prepared by dissolving or dispersing at least one polymer (known at the "pre-formed polymer") in unsaturated monomer, dispersing the resulting solution or emulsion in water and then polymerising the acrylic monomer to form multi-polymer particles. The technique is described in, for example, U.S. Pat. Nos. 4,373,054 and 4,413,073, which, while covering a wide range of pre-formed polymers, do not mention or exemplify the use of silicones. It has been found, as mentioned hereinabove, that the combination of multi-polymer particle technology and silicone compounds frequently gives surprisingly good results.

It should be noted at this point that the term "multi-polymer particle" in this specification does not necessarily imply that the silicone compound need always be polymeric. It is well known to the art that many of the most common (and most useful) silicone compounds are oligomeric rather than polymeric, and even silicones with a single Si—O—Si linkage can provide useful properties. The use of the term "multi-polymer particle" is considered to encompass these variants.

By "silicone compound" is meant a compound wherein the compound comprises at least one Si—O—Si linkage. As mentioned hereinabove, such compounds may be "monomeric", oligomeric or polymeric. Various groups may be attached to the silicon atoms via the remaining valencies, and the nature of these groups will determine the characteristics of the silicone compound and thus the properties which it will confer on the final coating compositions. The most favoured groups are phenyl and methyl and most silicone compounds used in coatings comprise a blend of these. However, other groups may also be used, typical examples being lower alkoxy groups such as methoxy and ethoxy and alkyl groups such as ethyl and propyl.

A large number of suitable silicone compounds is now commercially available, as is a considerable body of information on their properties and uses, and this will permit the skilled person to select the right silicone compound for any particular purpose. The resins are commonly available as high solids solutions in solvent such as toluene or xylene.

A valuable feature which is permitted by the present invention is the formation of silicone compounds in situ rather than add existing silicone compounds. In this case, the silicone compound is prepared from silicone compound precursors which are reacted to form a silicone compound. This may be done by any convenient means, a typical example of which is the self-condensation of alkoxy silanes in the presence of water at mildly basic pH.

The silicone compound may be provided wholly by a preformed silicone compound or a silicone compound formed in situ or by a mixture of both.

The unsaturated monomer with which the silicone compound is associated and which is then polymerised to form multi-polymer particles may be selected from the wide range of such materials well known to the art, subject to the provision that the monomer (which may be a single monomer or mixture of monomers) be at most partially water-soluble, by which is meant that the monomer must have a maximum solubility in water of 25% by weight at 25° C.

In the case of monomer mixtures, it is permissible that individual monomers be water-soluble, provided that the overall water solubility does not exceed 25%. Typical examples of monomers suitable for use in this invention are the $C_1$–$C_{20}$ (especially the $C_1$–$C_4$) alkyl acrylates and methacrylates, (meth)allyl acrylate and methacrylate, styrene, the mixed isomers of methyl styrene known as "vinyl toluene", and vinyl acetate. Functional monomers such as hydroxypropyl methacrylate and acrylic and methacrylic acids may also be used, especially when a cross-linkable system is desired. In a cross-linkable system, a small proportion (4% by weight maximum) of acrylic acid is particularly preferred.

The addition polymer dispersions are prepared by firstly dissolving or dispersing a silicone compound (more than one may be used) in the unsaturated monomer and then polymerising the unsaturated monomer. It is a feature of the multi-polymer particle technique that even silicone compounds which are relatively incompatible with the monomer can be tolerated, and silicone compounds not normally used with addition polymers or in aqueous coating compositions may be used in this invention. The solution or dispersion of silicone in monomer also comprises a portion, typically 5% by weight of the film-forming components, of at least one surfactant. This may be anionic, cationic or non-ionic, but it must have a hydrophile-lipophile balance (HLB) value of at least 8. The HLB value is a well-known parameter in the surface coatings industry and the term is used here in a conventional sense. A preferred type of surfactant is the surfactant which comprises at least one ethylenically unsaturated double bond. Especially preferred are the types disclosed in U.S. Pat. Nos. 4,413,073 and 4,538,000.

The resulting solution or dispersion of silicone in monomer is then emulsified into water by conventional means. This process can be assisted by the addition of a small proportion (up to 5%) of a co-solvent.

When the silicone compound is to be prepared in situ, one of two methods of preparation can be used. In the first method, the silicone compound precursor is dissolved or dispersed in the monomer as hereinabove described in relation to "pre-formed" silicone compounds. The precursor can be reacted to form a silicone compound. An alternative method is first to dissolve or disperse in the monomer a minor portion of a silicone compound or silicone compound precursor, then to disperse this blend in water, and finally to add to the water with stirring a silicone compound precursor. Polymerisation may be carried out either before or after silicone compound precursor addition.

The silicone compound (or silicone compound precursor) should be present such that the weight ratio of silicone compound to addition polymer lies in the range of from 1:99 to 95:5, more preferably 5:95 to 50:50 and most preferably 15:85 to 40:60.

Polymerisation of the monomer may be initiated by any suitable free-radical means. For example, a free radical initiator such as azobisisobutyronitrile may be used. Alternatively, a redox initiation system may be used; this allows polymerisation to be initiated conveniently at room temperature. The nature of the redox initiation system to be used depends to some extend on the nature of the monomer, but selection of a suitable system is within the knowledge of the art. Typical examples of suitable systems are t-butyl perbenzoate/sodium ascorbate and cumene hydroperoxide/sodium ascorbate.

The initiation systems are preferably oil-soluble systems, and the result will be a suspension (mini-bulk) polymerisation. However, it is also possible to use water-soluble initiation systems. The nature of the polymerisation involved in this case is not completely understood, but it works surprisingly well. The cumene hydroperoxide/sodium ascorbate system hereinabove described can be used in this fashion as cumene hydroperoxide is partially soluble in water.

The dispersion of the invention may be cross-linkable. Cross-linking ability may be provided via the presence of reactive groups on either or both of the silicone compounds or the addition polymer, which groups react with a cross-linking agent. The cross-linking agent may be added to the continuous phase, to the disperse phase (that is, it forms part of the multi-polymer particles) or to both phases. It may also be incorporated into a coating composition at the final make-up stage. Cross-linking may be activated by stoving; in such a case, the cross-linking agent will not react at ambient temperature and a composition comprising an integral cross-linking agent will be stable until stoved. An alternative method is to use a "two-pack" system, wherein cross-linking agent and dispersion react on mixing and are kept in separate containers, being mixed prior to use.

The preferred cross-linking agent for the purpose of this invention is an alkylated methylol melamine, especially hexamethoxymethyl melamine. This is readily available commercially, for example, the range of compounds sold under the registered trade mark "Cymel". While the quantity of cross-linking agent used is not narrowly critical and the normal art-recognised quantities will give satisfactory results, it has been found that the best results are given when the ratio of cross-linking agent to silicone compound plus addition polymer is in the range of from 10:90 to 30:70, more preferably 20:80 to 25:75. In a further preferred embodiment, the action of the cross-linking agent is catalysed by means of an acid catalyst, for example, dinonyl naphthalene disulphonic acid (available, for example, under the trade mark "Cycat" 500 (ex American Cyanamid Co.)), used at the rate of from 3%–5% by weight of cross-linking agent solids.

The addition polymer dispersions prepared by the process as hereinabove described may be used as the film-forming components of coating compositions. Conventional additives such as pigments, extenders, thickening agents, catalysts and fungicides may be added in art-recognised quantities.

A particularly useful additive is a co-solvent, that is, a liquid which is miscible with both continuous and disperse phases, which permits the modification of the film-forming properties of the dispersion and, as mentioned hereinabove, can assist in the initial emulsification. It is a valuable feature of the present invention that the dispersions of the invention are very stable with respect to the presence of co-solvent.

The resulting coating compositions perform at least as well as known water-borne silicone coating compositions, and frequently as well as, or better than, the high-performance solvent-based systems. Moreover, there is a completely open choice of silicone resin, such that the optimum performance for any given end use may be easily built in.

The invention is further illustrated by the following examples in which all parts are expressed by weight.

EXAMPLE 1

Preparation of a Dispersion of Silicone Compound-containing Addition Polymer Particles Suitable for use in a Silicone Coating Composition According to the Invention, the Disperse Particles Containing a Cross-linking Agent The materials used were as follows:

| | | |
|---|---|---|
| A. Silicone[1] | 11.905 | parts |
| B. Styrene | 5.556 | parts |
| Methyl methacrylate | 7.937 | parts |
| Butyl acrylate | 7.540 | parts |
| Hydroxypropyl methacrylate | 5.556 | parts |
| Methacrylic acid | 1.111 | parts |
| Surfactant[2] | 1.984 | parts |
| C. Cross-linking agent[3] | 6.07 | parts |
| D. Cumene hydroperoxide | 0.556 | parts |
| E. De-ionised water | 10.000 | parts |
| F. De-ionised water | 39.468 | parts |
| G. De-ionised water | 2.000 | parts |
| Sodium erythorbate | 0.317 | parts |
| | 100.00 | |

[1] "Rhodorsil" (trademark) RH1036A ex Rhône-Poulenc.
[2] The reaction product of one mole of pentaerythritol triallyl ether with 2 moles of butylene oxide and 35 of ethylene oxide.
[3] "Cymel" (trademark) 303 ex American Cyanamid.

Materials A and B were loaded into a reaction vessel. This was followed with stirring by Material C. The temperature of the mixture was raised to 60° C. and stirring was continued until the surfactant (a solid material) was completely dissolved. Once this was achieved, the mixture was allowed to cool (still with stirring) to 25° C. The Material D was then loaded and mixed in. The mixture was then added to a vessel containing Material E, with high speed stirring, sufficient to ensure adequate circulation of the entire contents of the vessel. High speed stirring was continued until the maximum particle size of a sample of the resulting emulsion was less than 2 $\mu$m. Once this was achieved, Material F was added while gradually slowing the stirring speed. The Materials G were pre-mixed and added to the emulsion immediately after the addition of Material F was completed. Stirring was stopped and the reaction allowed to proceed. When completed, the resulting dispersion of polymer particles was filtered through a 5 $\mu$m filter. The solids content was 47.5% by weight.

EXAMPLE 2

Example 1 was repeated except for the following changes:
the "Cymel" cross-linking agent at Stage 3 was replaced with 9.921 parts (61.2% solids) of N-butoxymethyl acrylamide.
the water at Stage F was 35.617 parts.
The result was a white dispersion of polymer particles of solids content 47.5%.

EXAMPLE 3

Preparation of a Silicone Compound-containing Addition Polymer Dispersion for use in a Coating Composition According to the Invention, the Disperse Particles not Containing a Cross-linking Agent Example 1 was repeated with the following changes:
the cross-linking agent at Stage C was omitted.
45.538 parts of water was used at Stage F.
The result was a white dispersion of weight solids content 41.6%.

EXAMPLE 4

Preparation of a Polymer Dispersion for use in a Coating Composition According to the Invention, the Disperse Particles not Containing a Cross-linking Agent Example 1 was repeated with the following changes: the Stage B materials were replaced by the following materials and quantities:

| | |
|---|---|
| Styrene | 5.560 parts |
| Methyl methacrylate | 8.830 parts |
| Butyl acrylate | 7.190 parts |
| Hydroxypropyl methacrylate | 5.560 parts |
| Surfactant | 1.984 parts | the C stage was omitted
46.098 parts of water was used at the F stage.
The result was a white dispersion of weight solids content 41.6%.

EXAMPLE 5

Preparation of a Coating Composition According to the Invention (a) Preparation of Millbase The following components were ball milled for 24 hours until a dispersion of less than 5 $\mu$m as measured on a Hegman gauge was obtained:

| | |
|---|---|
| Pigment dispersion solution[1] | 2.85 parts |
| De-ionised water | 1.55 parts |
| Ethylene glycol | 3.38 parts |
| "Balab" (trademark) anti-foam | 0.80 parts |
| Titanium dioxide pigment | 3.94 parts |
| Red oxide pigment | 0.87 parts |
| "Mapico" (trademark) tan iron oxide pigment | 4.86 parts |
| Carbon black pigment | 0.31 parts |
| [1]Pigment dispersant solution was made up from | |
| "Primal" (trademark) I-62 dispersant | 49.75 parts |
| Dimethylethanolamine | 3.88 parts |
| Water | 46.32 parts |

(b) Preparation of Coating Composition

A coating composition was made up by blending the following components:

| | |
|---|---|
| Millbase | 18.56 parts |
| Aqueous dispersion (from Example 1) | 75.02 parts |
| Butyl "Cellosolve" (trademark) solvent | 3.74 parts |
| Catalyst solution[2] | 1.39 parts |
| Silica (flattening agent) | 1.29 parts |
| [2]The catalyst solution was made by mixing the following ingredients: | |
| "Cycat" (trademark) 500 catalyst | 0.139 parts |
| Dimethylethanolamine | 0.139 parts |
| Water | 1.112 parts |
| | 1.390 |

The resulting coating composition had a "weathered copper" colour. It could be applied to pre-treated and primed metal by any convenient means and had excellent durability.

EXAMPLES 6-7

Preparation of a Dispersion of Silicone Compound-containing Addition Polymer Particles, Wherein the Ratios of Silicone Compound to Addition Polymer Particles are 10:90 and 60:40. There was no Crosslinking Agent Example 1 was repeated with the substitution of the following materials and proportions for those used in Example 1 and the omission of Stage C:

|   |   | Example 6 | Example 7 |
|---|---|---|---|
| A | Silicone[1] | 3.960 parts | 27.12 parts |
| B | Styrene | 7.150 parts | 3.630 parts |
|   | Methyl methacrylate | 10.210 parts | 5.540 parts |
|   | Butyl acrylate | 9.700 parts | 4.740 parts |
|   | Hydroxypropyl methacrylate | 7.150 parts | 3.630 parts |
|   | Methacrylic acid | 1.430 parts | 0.540 parts |
|   | Surfactant[1] | 1.984 parts | 2.712 parts |
| D | Cumene hydroperoxide | 0.713 parts | 0.635 parts |
| E | De-ionised water | 10.000 parts | 10.000 parts |
| F | De-ionised water | 44.275 parts | 38.091 parts |
| G | De-ionized water | 3.000 parts | 3.000 parts |
|   | Sodium erythorbate | 0.428 parts | 0.362 parts |

[1]Silicone and surfactant as used in Example 1

In both cases, the result was a white dispersion.

EXAMPLE 8

Preparation of a Dispersion of Silicone Compound-containing Addition Polymer Particles, Wherein the Ratio of Silicone Compound to Addition Polymer was 30:70 and the Silicone Compound was Partially Derived from Silicone Compound Precursor To 85.57 parts of the dispersion prepared in Example 6 was added a quantity of a 1:1 weight blend of dimethyl ethanolamine and water sufficient to bring the mixture to neutral pH. The dispersion was then stirred slowly and 13.83 parts of a silicone compound precursor (Silicone QP8-5314 (ex Dow Corning)) was added, stirring being continued until the silicone compound precursor was fully incorporated. The mixture was then allowed to stand for 16 hours. The result was a white dispersion of weight solids content 45.1%.

Observation by electron microscope revealed a complete absence of particles of the Silicone QP8-5134, thus indicating that it had reacted to form part of the disperse silicone compound-containing particles.

EXAMPLES 9-10

Preparation of two coating compositions according to the invention and comparative testing against a commercially-available composition.

The following ingredients were blended:

|   | Example 9 | Example 10 |
|---|---|---|
| Millbase (from Example 5(a)) | 18.56 parts | 18.56 parts |
| Aqueous dispersion (from Example 3) | 56.30 parts | — parts |
| Aqueous dispersion (from Example 8) | — parts | 70.46 parts |
| Butyl "Cellosolve" solvent | 3.74 parts | 3.75 parts |
| Hexamethoxymethyl melamine[1] cross-linking agent | 7.81 parts | 4.75 parts |
| Catalyst solution (from Example 5(b)) | 3.90 parts | 1.42 parts |
| Water | 8.40 parts | — parts |
| Silica | 1.29 parts | 1.29 parts |

[1]"Cymel" 303 was used

Example 9 had a cross-linking agent: silicone+addition polymer ratio of 25:75 and the percentage catalyst active ingredient on cross-linking agent solids was 5%.

Example 10 had a cross-linking agent: silicone+addition polymer ratio of 13:87 and the percentage catalyst active ingredient was 3%.

The compositions were exposed to accelerated UV testing in a QUV cabinet according to the method of ASTM D4578-86. A commercially-available SMP-based composition was also tested. Testing details were as follows:

All three coatings were drawn down over pre-primed "Zincalume" panels using a 32 wire-wound draw-down bar. They were then baked for 60 s. to a peak metal temperature (PMT) of 232° C., resulting in a film of 18–20 μm thickness.

The testing was carried out using UVB 313 tubes and using a cycle of 4 h. UV at 60° C. followed by 4 h. condensation at 50° C.

The results were as follows:

|   | 0 h | 400 h | 1000 h | 1600 h |
|---|---|---|---|---|
| SMP |   |   |   |   |
| Gloss (60° head) | 25.0 | 1.6 | 0.8 | 0.8 |
| Colour change (D$_E$) | — | 0.64 | 1.70 | 2.13 |
| Example 9 |   |   |   |   |
| Gloss (60°) | 32.7 | 29.9 | 20.8 | 16.0 |
| Colour change (D$_E$) | — | 0.28 | 1.19 | 1.62 |
| Example 10 |   |   |   |   |
| Gloss (60°) | 37.0 | 39.6 | 38.9 | 35.7 |
| Colour change (D$_E$) | — | 0.29 | 0.48 | 0.78 |

It can be seen from these results that the compositions according to the invention outperform the established SMP-based product.

EXAMPLE 11

Use of an Unusual Silicone

Example 1 was repeated, replacing the silicone in stage A of that example with Dow Corning DC704, a fluid silicone which is usually used as a working fluid in diffusion pumps and is not usually considered to be useful in coating compositions.

The resulting white dispersions exhibited good properties when deposited as a coating film.

An attempt was made to prepare a siliconised latex using this silicone. The silicone proved to be incompatible with the system and the resulting coating composition did not form a coherent film.

EXAMPLE 12

Use of a Different Surfactant

Example 1 was repeated, replacing the surfactant in Stage B with a surfactant which was the reaction product of 1 mole cetyl alcohol with 1 mole allyl glycidyl ether and 40 moles ethylene oxide. The resulting white dispersion gave excellent properties when coated out as a film.

The claims defining this invention are as follows:
We claim:

1. An aqueous silicone compound coating composition comprising an addition polymer dispersion and at least one silicone compound, the silicone compound forming part of the disperse phase of a dispersion of multi-polymer particles formed by polymerization of one or more unsaturated monomers in the presence of the silicone compound and a surfactant comprising at least one ethylenically unsaturated double bond.

2. An aqueous silicone compound coating composition according to claim 1, wherein the unsaturated monomer used to form the addition polymer dispersion has a maximum water solubility of 25% by weight at 25° C.

3. An aqueous silicone compound coating composition according to claim 1 or claim 2, wherein the unsaturated monomer comprises up to 4% by weight of acrylic acid.

4. An aqueous silicone compound coating composition according to claim 3, wherein the silicone compound is firstly dissolved or dispersed in unsaturated monomer in the presence of a surfactant of HLB at least 8.

5. An aqueous silicone compound coating composition according to claim 1, wherein the silicone compound is at least partially prepared in situ from a silicone compound precursor.

6. An aqueous silicone compound coating composition according to claim 5, wherein the ratio of silicone compound or silicone compound precursor to addition polymer in the multi-polymer particles is in the weight ratio or 1:99–95:5.

7. An aqueous silicone compound coating composition according to claim 6, wherein the ratio is 5:95–50:50.

8. An aqueous silicone compound coating composition according to claim 6, wherein the ratio is 15:85–40:60.

9. An aqueous silicone coating composition according to claim 8, wherein the composition comprises a cross-linking agent, and wherein at least one of the silicone compound and the addition polymer comprise reactive groups which are capable of reacting with a cross-linking agent.

10. An aqueous silicone coating composition according to claim 9, wherein the weight ratio of cross-linking agent to silicone+addition polymer is from 10:90 to 30:70.

11. An aqueous silicone coating composition according to claim 10, wherein the ratio is from 20:80 to 25:75.

12. An aqueous silicone coating composition according to claim 9, wherein the cross-linking agent is an alkylated hexamethoxymethyl melamine.

13. An aqueous silicone coating composition according to claim 12, wherein the action of the cross-linking agent is catalysed by means of an acid catalyst.

14. An aqueous silicone coating composition according to claim 13, wherein the acid catalyst is dinonyl napththalene disulphonic acid used at a rate of from 3% to 5% by weight of the cross-linking agent solids.

* * * * *